UNITED STATES PATENT OFFICE.

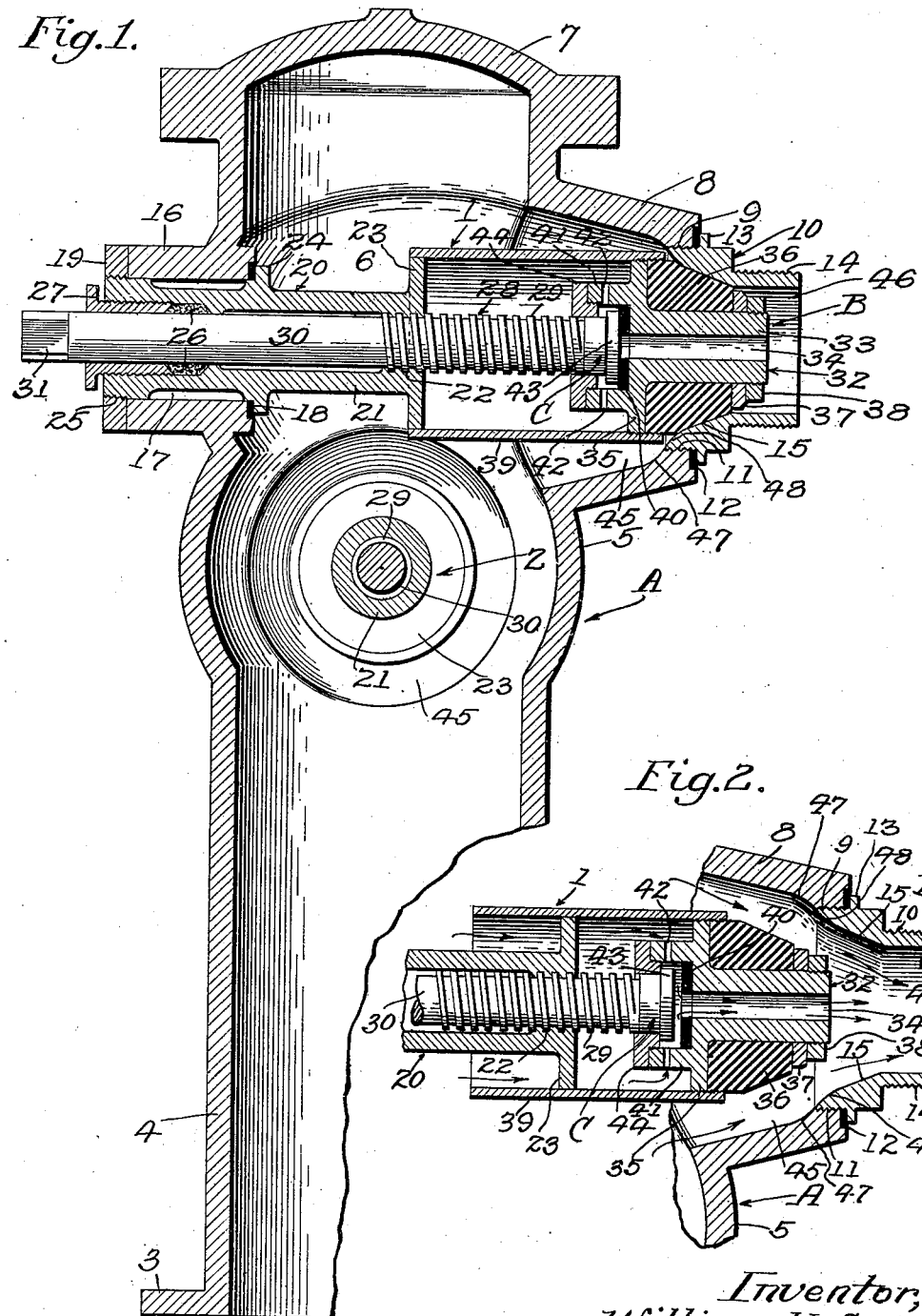
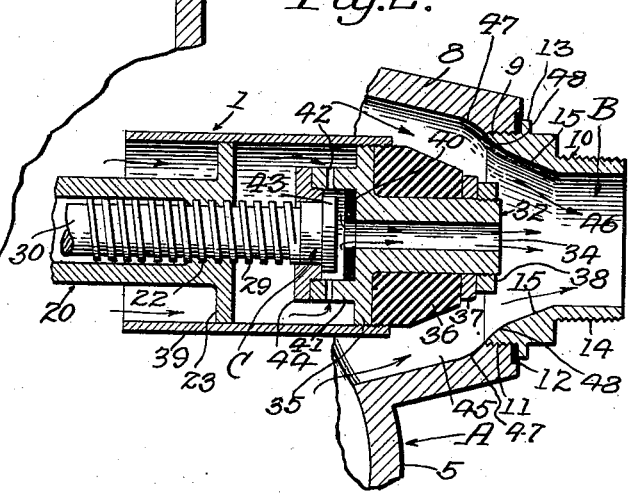

WILLIAM H. SYMONS, OF SAN DIEGO, CALIFORNIA.

FIRE-HYDRANT.

991,559.  Specification of Letters Patent.  Patented May 9, 1911.

Application filed October 14, 1910. Serial No. 586,979.

*To all whom it may concern:*

Be it known that I, WILLIAM H. SYMONS, a citizen of the United States, residing at San Diego, California, have invented a new and useful Fire-Hydrant, of which the following is a specification.

Primarily my object is to improve the details of a fire hydrant or the like; and my invention consists of the novel features herein shown, described and claimed.

Specifically one of the main objects of my invention is to control the water pressure by an auxiliary valve, so that the pressure or absence of pressure will assist in opening or closing the main valve.

Another object is to construct a hydrant body and mount the main and auxiliary valves in the hydrant body so that they may be removed, repaired and replaced through the nozzle opening of the hydrant body.

Another object is to shape the hydrant body and nozzle so that there will be a free flow of water to the nozzle.

Another object is to provide a hydrant body and apply a plurality of independent nozzle mechanisms.

In the drawings: Figure 1 is a vertical central section of a fire hydrant embodying the principles of my invention, the valve mechanism being shown closed. Fig. 2 is a fragmentary section on the same plane as Fig. 1, and showing the valve mechanism open.

Referring to the drawings in detail a fire hydrant embodying the principles of my invention comprises: A, a hydrant body. B, a main valve mechanism. C, an auxiliary valve mechanism.

In Fig. 1 I have shown two independent valve mechanisms, 1 and 2, the valve mechanism 2 being mounted below and crosswise of the valve mechanism 1.

The hydrant body A comprises: a base flange 3; the vertical stand pipe 4; the bulge 5 around the valve mechanism 2; the bulge 6 around the valve mechanism 1, and the head 7 closing the upper end of the water chamber.

The valve mechanisms 1 and 2 are substantially alike and for the valve mechanism 1 there is a nozzle base 8 extending outwardly from the bulge 6, the opening through this nozzle base being funnel shaped, with its large end inwardly, and there is a similar nozzle for the valve mechanism 2.

The details of the main valve B are as follows: The small outer end of the base 8 has an internal screw thread 9. The nozzle bushing 10 has an external screw thread 11 fitting the screw thread 9, and the outer face of the nozzle base 8 is finished to receive the gasket 12. A flange 13 extends outwardly around the bushing 10 and fits against the gasket 12 so as to form a tight joint between the bushing 10 and the nozzle base 8. The outer end of the bushing 10 is reduced in size and has an external screw thread 13 to receive the hose coupling. The inner end of the passage through the bushing 10 has an inclined face 15, which forms the main valve seat. In horizontal alinement with the nozzle base 8 and diametrically across the hydrant body A is a boss 16, having an opening 17 in alinement with the opening through the bushing 10. The inner face of the boss 16 is finished to receive the gasket 18, and the outer face is finished to receive the lock nut 19. The valve frame 20 comprises, the cylindrical body 21, having an internal screw seat 22 for the valve stem and having an annular flange 23 at its inner end and having a flange 24 at its center to fit against the gasket 18 and having an external screw thread 25 at its outer end to receive the lock nut 19; so that when the lock nut 19 is tightened a tight joint is formed between the valve frame and the boss 16. The outer end of the cylinder 20 is bored out to receive the stuffing box packing 26 and the bore is internally screw threaded to receive the stuffing box nut 27. The valve stem 28 has an external screw thread 29 to fit the screw thread 22 and the outer half 30 of the valve stem is smaller than the screw thread, so that the valve stem is inserted from the inner end of the cylinder 20, through the stuffing box, and there is a wrench seat 31 upon the outer end of the valve stem. The main valve proper, 32, comprises, a cylindrical body 33 having a central bore 34; an annular flange 35 extending from the inner end of the cylindrical body and having an external screw thread; a rubber gasket 36 fitting upon the cylindrical body against the outer side of the flange 35; a washer 37 fitting upon the cylindrical body against the rubber gasket 36 and a nut 38 screw seated upon the outer end of the cylindrical body 33, against the washer 37, said gasket 36 fitting the valve seat 15. A hollow cylinder 39 is screw seated upon the flange 35 and slides upon the flange 23.

The details of the auxiliary valve C are as follows: The inner end of the cylindrical body 33 is finished to receive the gasket 40. The cylindrical body 41 extends from the flange 35 around the gasket 40, there being ports 42 leading through the cylindrical body 41. A valve head 43 is formed upon the inner end of the valve stem 28 and fits against the gasket 40, and a stuffing box nut 44 is placed loosely upon the valve stem 28 and screwed into the cylindrical body 41 so as to allow the valve head 43 to move back and forth a short distance within the chamber of the cylindrical body 41. The bulge 6 of the hydrant body communicates with the passage through the nozzle base 8 and makes a large chamber around the valve mechanism so as to provide a free passage of water through the bushing 10 when the main valve is open. The passage 45, through the nozzle base 8, leads to the passage 46, through the outer end of the bushing 10, by a curved line 47 of the nozzle base 8, joining to the curved line 48 at the inner end of the bushing.

Suppose that the main valve B and the auxiliary valve C are closed as in Fig. 1 and it is desired to open the main valve; a wrench is applied to the wrench seat 31 and the valve stems screwed backwardly until the head 43 is withdrawn from the gasket 40 and then the water pressure within the cylinder 39 passes through the ports 42 and through the bore 34, thereby relieving the pressure behind the main valve. Then as the valve stem 28 is further operated the gasket 36 is withdrawn from the valve seat 15. It is obvious that the flange 23 holds the water pressure from pressing against the main valve at this time and that it will be a great deal easier to unseat the main valve without the water pressure against it than is the case where the water pressure operates directly against the main valve. When it is desired to close the valve the valve stem 28 is operated to press against the gasket 40 and to press the gasket 36 against the valve seat 15 and as soon as the head 43 closes the opening 34 the water pressure going into the cylinder 39, through the crack between the flange 23 and the cylinder 39, will assist in pressing the main valve into position and holding it in position.

An entire valve mechanism may be removed from the hydrant body by removing the lock nut 19 and unscrewing the bushing 10.

Referring to Fig. 2 it is obvious that the water flowing outwardly through the nozzle or bushing 10 will press backwardly on the main valve 36 and that by virtue of the fact that the passage of the ports 42 and the opening 34 is greater than the leakage through the joint between the flange 23 and the cylinder 39, the pressure on the back side of the valve is relieved. In other words the flange 23 holds the main water pressure from the back side of the main valve so that the valve will open freely.

It is obvious that the details and proportions may be varied in many ways without departing from the spirit of my invention.

Special attention is called to the fact that the hydrant body is cast in a single piece, thus doing away with the necessity of flange joints, etc., and to the fact that the water in the cylinder 39 is behind the valve and presses the valve into the seat and that this feature forms a water cushion behind the valve which will effectually prevent chattering when the valves are seated or about seated and that the form of the outlet through the valve, with its large end toward the water pressure, will prevent "water hammer" in closing the valve and that the valve mechanism extends through the hydrant body and points outwardly instead of inwardly. Special attention is also called to the fact that the diameter of the cylinder 39 containing the water cushion is greater than the diameter of the valve opening and that when a hose is attached and the auxiliary valve opened the back pressure will unseat the main valve.

I claim—

1. In a fire hydrant, a stand pipe, a funnel shaped nozzle base extending outwardly from the stand pipe with its small end outwardly; said small end being internally screw-threaded, a nozzle bushing screw seated in the nozzle base and having an external screw-thread on its outer end to receive a hose coupling and having a valve seat upon its inner end, and there being an opening through the opposite side of the stand pipe in alinement with the opening through the bushing; the surface around the inner end of the opening being finished to form a tight joint, and the surface around the outer end of the opening being finished to receive a lock nut, a valve frame mounted in said alined opening and adapted to form a tight joint with said inner finished base and having an external screw-thread on its outer end and a lock nut on said external screw-thread so that by removing the bushing and removing the lock nut the valve frame may be removed through the bushing opening.

2. In a fire hydrant, a stand pipe having transversely alined openings, one of said openings being larger than the other, a valve frame inserted through the larger opening and fitted into the smaller opening, a valve stem mounted in the valve frame, a flange upon the inner end of the valve frame, a valve upon the inner end of the valve frame, there being a relief port through the valve controlled by the operation of the valve stem, and a hollow cylinder mounted upon the valve and sliding upon the flange at the inner end of the valve frame so that when the valve stem is screwed backwardly the relief port will be opened, thereby releasing the pressure behind the valve and allowing the cylinder to slide backwardly upon the flange; said flange holding the pressure from the valve.

WILLIAM H. SYMONS.

Witnesses:
HANNA MENDENHALL,
ANDREW K. MARTELL.

Copies of this patent may be obtained for five cents each, by addressing the "Commissioner of Patents, Washington, D. C."